United States Patent [19]

Palliser

[11] Patent Number: 4,750,872

[45] Date of Patent: Jun. 14, 1988

[54] CENTRIFUGAL PUMP WITH DAMPED MOTOR CONNECTION

[75] Inventor: Alfred M. H. Palliser, Sark, Channel Islands

[73] Assignee: Easthorpe Investments Ltd., Isle of Man

[21] Appl. No.: 878,181

[22] Filed: Jun. 25, 1986

[30] Foreign Application Priority Data

Jul. 1, 1985 [GB] United Kingdom ............... 8516653
Feb. 18, 1986 [GB] United Kingdom ............... 8603977

[51] Int. Cl.⁴ .................. F04B 17/00; F04B 35/00
[52] U.S. Cl. .................. 417/423 R; 417/424; 416/244 R; 464/160
[58] Field of Search ........... 417/423 R, 423 G, 423 P, 417/423 T, 424 A, 424 R, 423 F; 415/206, 219 C; 416/244 R, 204 R; 464/73, 74, 75, 160

[56] References Cited

U.S. PATENT DOCUMENTS

| | | | |
|---|---|---|---|
| 2,752,517 | 6/1956 | Von Delden | 310/89 |
| 3,072,062 | 1/1963 | Cralle et al. | 417/423 T |
| 3,333,742 | 8/1967 | LaFlame | 417/423 P |
| 3,386,264 | 6/1968 | Paulsen | 464/74 |
| 3,529,440 | 9/1970 | Bauer | 464/73 |
| 3,853,429 | 12/1974 | Wiedenmann | 417/423 G X |
| 4,512,724 | 4/1985 | Horvath | 417/423 T X |
| 4,523,915 | 6/1985 | Mutschler | 464/73 X |
| 4,557,672 | 12/1985 | Levine | 416/244 R X |

FOREIGN PATENT DOCUMENTS

1052244 3/1959 Fed. Rep. of Germany ...... 417/424

Primary Examiner—Leonard E. Smith
Assistant Examiner—Eugene L. Szczecina, Jr.
Attorney, Agent, or Firm—Helfgott & Karas

[57] ABSTRACT

The pump comprises a pump body and a volute complementary to each other which, once assembled, provide a sealed body defining a first chamber, containing a permanent magnet rotor, and a second chamber containing an impeller and provided with suction and delivery conduits. The stator body of the electric motor externally encircles the second chamber, thus never being reachable by the pumped liquid. The rotor and the impeller are kept coaxial to one another by centering means and have engagement elements which reciprocally connect them in the rotation.

3 Claims, 9 Drawing Sheets

CENTRIFUGAL PUMP WITH DAMPED MOTOR CONNECTION

BACKGROUND OF THE INVENTION

The present invention relates to a centrifugal pump particularly suitable for use with washing machines, dishwashers or other similar household appliances which provide liquid discharge operating cycles.

Centrifugal pumps of the known kind, usually employed in household appliances such as dishwashers and washing machines, are generally composed of an asynchronous motor combined with a centrifugal pump the impeller of which is positioned in a sealed chamber.

In practice the axle of the electric motor enters the pump body with the interposition of an annular or toroidal liquid seal which prevents the liquid from flowing out.

This seal represents one of the most critical points of the motor-to-pump coupling and the leakage of liquid through this seal is one of the most frequently occurring and damaging failures, as it usually results in the electric motor being damaged.

It should be further considered that the pump, particularly if installed in washing machines for domestic use, is affected by a liquid which carries in suspension sand and dust which produce a damaging abrasive effect, especially on the seals in the moving parts, and fiberous matter which by twisting around the impeller and the axle of the pump cause remarkable inconveniences which may even entail the jamming of the pump itself.

The problem of a jammed pump in a household appliance is not a minor one because, additionally to blocking the machine, it requires the intervention of highly specialized personnel also because of the notable complexity due to the hydraulic sealing and centering means themselves.

Also from a production standpoint, the making of asynchronous motors and their subsequent association with pumps of the centrifugal kind, having a separate structure, turns out to be particularly expensive and may imply very difficult assembly.

SUMMARY OF THE INVENTION

The primary purpose of the present invention is to eliminate the above described disadvantages in known kinds of centrifugal pumps, by providing a centrifugal pump which, because of its peculiar characteristics, is capable of ensuring complete hydraulic sealing of the liquid, eliminating any possibility of leakage, without however necessarily entailing the use of particular sealing means.

Within the scope of the above described aim, a further object of the invention is to provide a centrifugal pump which combines the preceding characteristic with the characteristic of being endowed with a remarkable simplicity in the centering thereof.

Another object is to provide a pump structured in such a way as to be only minimally affected by the presence of sand, dust or fiberous matter suspended in the liquid being pumped.

A further object is to provide a centrifugal pump composed of readily available parts, which are mass produceable at reduced costs.

A not least object is to provide a pump which, though being capable of offering the most ample guarantees of reliability and safety in use, has a very modest global cost which may contribute towards its popularity among potential users.

The above described aim, as well as the objects described and others which will become apparent hereinafter are achieved by a centrifugal pump particularly for washing machines, dishwashers and similar household appliances, characterized in that it comprises a pump body and a volute, complementary to each other, which once assembled provide a sealed body defining a first chamber and a second chamber, said first chamber containing a permanent magnet rotor, said second chamber containing an impeller, said rotor and said impeller, being maintained coaxial to each other by centering means, and reciprocally rotatively associated by coupling means, externally to said pump body being provided the stator body of an electric motor.

BRIEF DESCRIPTION OF THE DRAWINGS

Further characteristics and advantages of the invention will be more clearly understood by describing three preferred, but not limitative, embodiments of a centrifugal pump according to the invention, illustrated by way of indication and not of limitation in the accompanying drawings, wherein.

DESCRIPTION OF THE PREFERRED EMBODIMENTS

With reference to the FIGS. 1 to 5, a first embodiment of a centrifugal pump according to the invention, generally indicated with the reference numeral 1, comprises a sealed body essentially composed of a pump body 2 and a volute 3, sealingly associable and complementary to each other.

Figure 1:
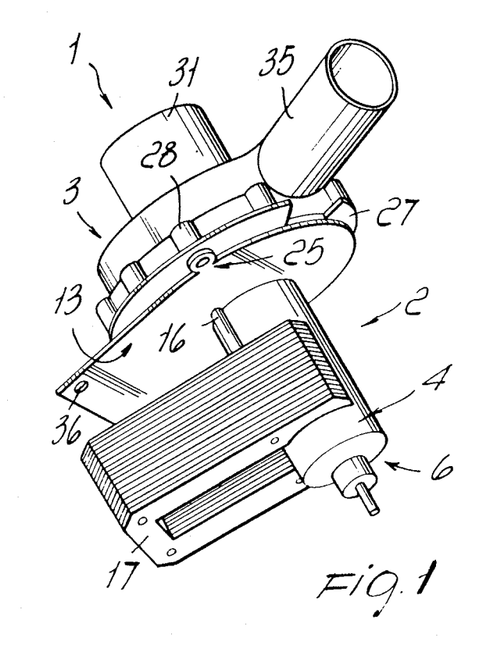
FIG. 1 is a perspective view of a first embodiment of the pump, wherein the electric windings of the stator body have been omitted.
Figure 2:
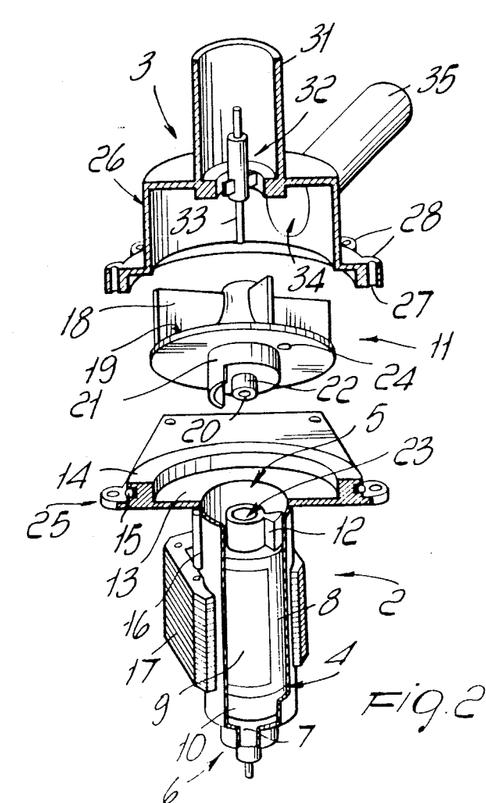
FIG. 2 is a view of the same pump of FIG. 1, illustrated exploded into its main components.
Figures 3, 4, 5:
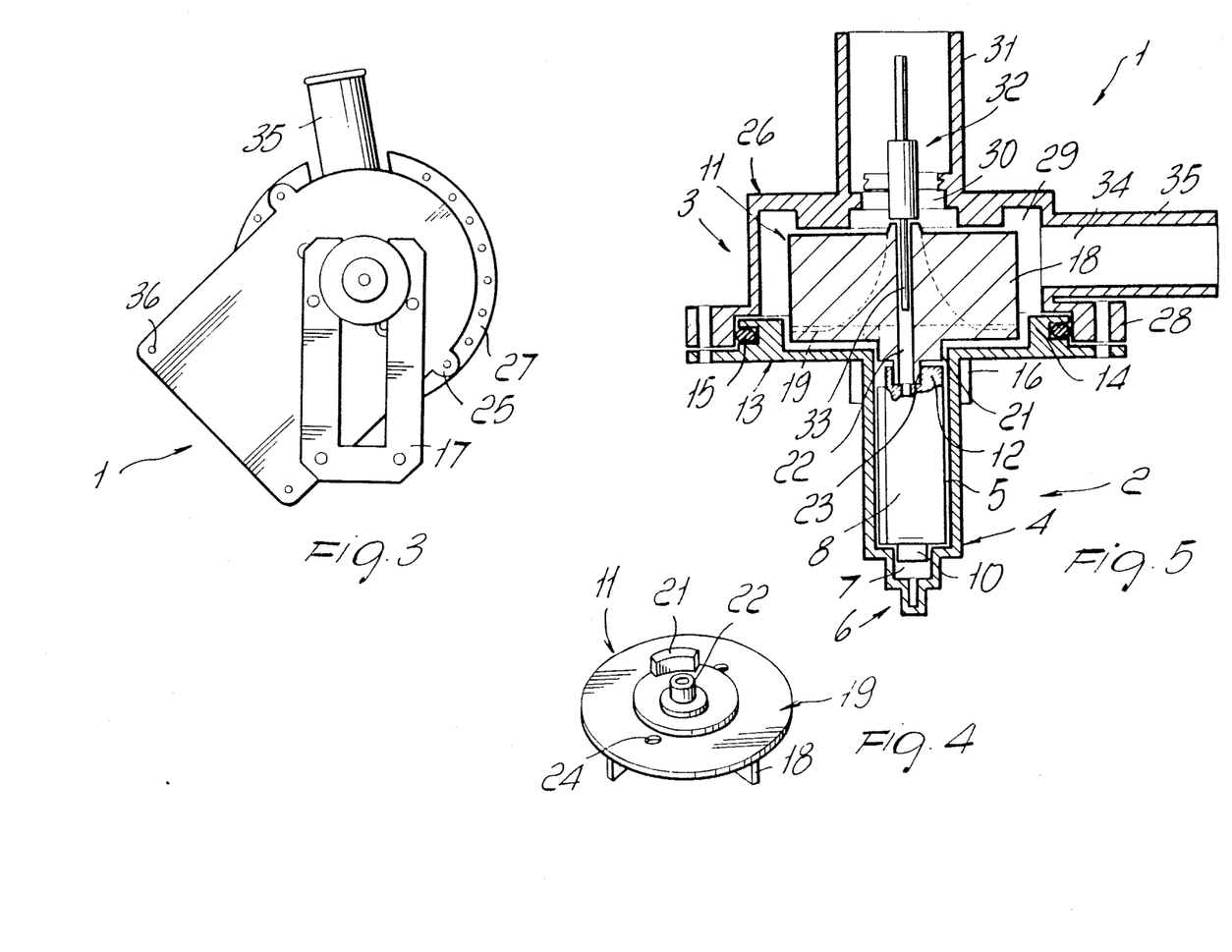
FIG. 3 is a front view, from the motor side, of the first embodiment of the pump, in which the electric windings of the stator body have been again omitted.
FIG. 4 is a lower three-quarters perspective view of the pump impeller illustrated in the preceding figures.
FIG. 5 is a cross section view according to a plane passing through the longitudinal mid axis of the impeller.

The pump body 2 comprises a cylindrical portion 4 which in its interior defines a first sealed chamber 5, there being endowed with a concentrical area 7 at its closed base 6, which area 7 has a reduced diameter.

Internally of the first chamber 5 is a rotor 8 with permanent magnets 9 downwardly provided with a centering section 10 shaped matchingly to the reduced area 7; on the opposite side of the rotor 8 there being provided an engagement means for an impeller 11 composed of a radially protruding tooth 12.

The depth of the first sealed chamber 5 is slightly greater than the length of the rotor 8 and from its open base and perpendicular thereto, extends a plate-like portion 13 having, on the opposite side to the cylindrical section 4, a raised element 14 in the shape of a circular crown, concentric to the axis of the first chamber 5 and provided with a seat for a seal such as, for example, an O-Ring 15.

On the outer surface of the cylindrical portion 4, from the plate-like portion 13, a plurality of longitudinal ridges 16 extend, which limit the position of maximum insertion of the stator laminations 17, which bears electric windings, not illustrated, of an electric stator body which therefore is positioned externally relatively to the first sealed chamber 5.

The centrifugal impeller 11 has a plurality of radial blades, which extend from an impeller body 19, the base thereof having a diameter slightly smaller than that of the raised element 14; it should further be noted that the impeller body 19, is provided at the central axis thereof, with a substantially cylindrical axial bore 20.

On the opposite side to the blades 18, from the impeller body 19 extends a means for engagement with the rotor 8, comprising a lug 21 adapted for interacting with the tooth 12 and, substantially proximate to the axial bore 20, protrudes downward a cylindrical centering element 22, matchingly shaped to a cavity 23 provided at the top end of the rotor 8.

Expediently, the lug 21 defines the shape of an arc of a circle, with an external diameter slightly smaller that that of the first sealed chamber 5, inside which it is insertable.

Furthermore the impeller 11 is provided, on its impeller body 19, with one or more passages 24. On the outer part of the plate-like portion 13 of the pump body 2 are provided one or more means for engagement with the volute 3, essentially composed of protruding portions 25 advantageously provided with a threaded bore.

The volute 3 is shown to be composed of a box-like body 26, with an essentially cylindrical shape, sealingly and removably associable with the pump body 2; the box-like body 26 may in fact be suitably provided with an annular base 27 associable with the plate-like portion 13 and having an internal diameter approximately equal to the outer one of the raised element 14.

Perpendicularly to the annular base 27 is present a plurality of connection means, suitably composed of perforated cylindrical sections 28 which can be made to coincide with the protruding sections 25, by rotating through an appropriate angle the position of the volute 3 relatively to that of the pump body 2.

The box-like body 26 defines in its interior a second sealed chamber 29 for containing the impeller 11. Above said second sealed chamber 29 is provided on the box-like body 26 a first opening 30 communicating with a suction conduit 31.

To the walls of the first opening 30 is rigidly coupled a centering means, which does not close this first opening, composed of a cylindrical element 32 from which extends a stem-like portion 33 protruding inside the second sealed chamber 29 and matchingly shaped to the axial bore 20 provided in the impeller body 19; the axis of this stem-like portion 33, therefore, coincides with that of the first sealed chamber 5.

On the side wall of the box-like body 26 is provided a second opening 34; whereto a delivery conduit 35 extends.

The plate-like portion 13 of the pump body 2 is provided with one or more bores 36 for means for fixing a support, if required.

The assembly and the operation of the above described embodiment 1 is therefore the following: initially, inside the first chamber 5 the rotor 8 will be positioned, by positioning the centering portion 10 in the provided reduced-diameter zone 7, so that the tooth 12 is positioned proximate to the plate-like portion 13.

Subsequently, the impeller 11 will be positioned, taking care to locate the cylindrical element 22 inside the cavity 23 provided on the rotor 8; this allows excellent centering of the impeller itself while the passages 24, by aiding in the initial passing of fluid inside the first sealed chamber 5, allows for self-centering of the rotor 8, forming between the chamber 5 and the cylindrical section 4 a film of liquid, such as, e.g., water.

Motion is transmitted from the rotor 8 to the impeller 11 by means of the interaction of the tooth 12 with the lug 21.

The subsequent phase of the assembly will be composed of stacking the volute 3 on top of the pump body 2, by inserting the stem-like portion 33 in the axial bore 20 provided on the impeller 11; this arrangement allows excellent centering of the elements which constitute the pump, both rotor and impeller having the same rotation axis.

The seal between the pump body 2 and the volute 3 is provided by virtue of the shape of the annular base 27, which, as it is partially matchingly shaped to the raised element 14, is endowed with a step-like discontinuity; furthermore, between the annular base 27 and the raised element 14, is furthermore accordingly placed a safety seal of a known kind, available on the market, such as, e.g., the O-Ring 15.

The position of the delivery conduit 35 can be chosen according to actual requirements, due to the presence of a plurality of cylindrical sections 28, rigidly coupled to the plate-like portion 13; it will indeed be sufficient to rotate the volute 3 on the plate-like portion 13 to have the protruding sections 25 and the cylindrical sections 26 coincide and join them to each other, according to requirements, either with a self-threading screw, or with a nut and associated bolt (not illustrated).

The plate-like portion 13 may be associated to a provided support by means of fixing means insertible into the holes 36 and therefore the stator body of the electric motor can be associated by inserting the cylindrical section 4 within its stator laminations 17 until it engages with the longitudinal ridges 16.

Figure 6:
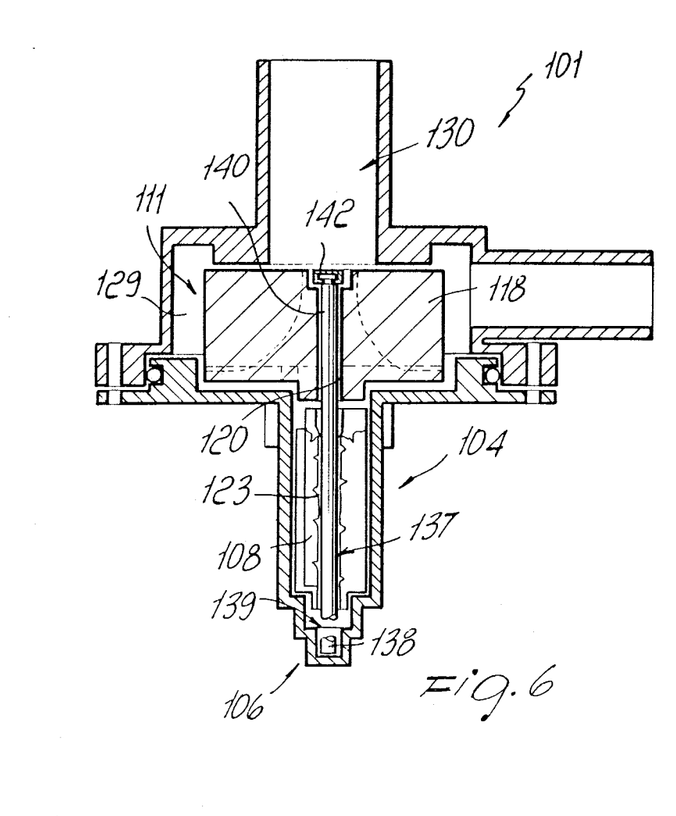
FIG. 6 is a longitudinal cross section of a constructive variation of the pump illustrated in the preceding figures.
Figure 7:
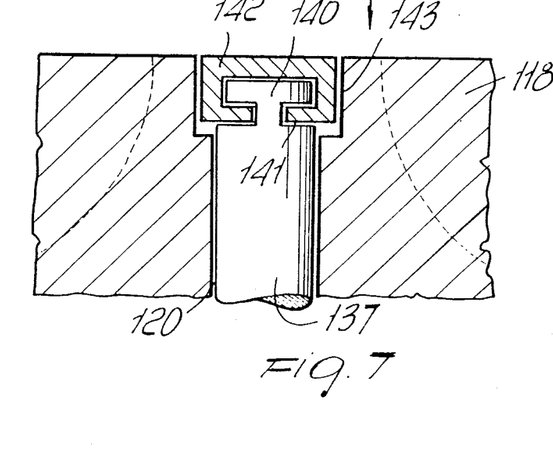
FIG. 7 is an enlarged-scale detail view of the preceding FIG. 6.

In the following FIGS. 6 and 7 is shown a constructive variation, generally indicated by reference numeral 101, of the centrifugal pump above described.

In the same, the rotor 108 and the impeller 111 are provided with a common centering means composed of a pin 137, advantageously of steel, which extends on the inside of the axial bore 120 of the through cavity 123, and has a diameter such that it allows for the rotation of the rotor 108 and of the impeller 111.

A first end 138 of the pin 137 is inserted and locked in a matchingly shaped cylindrical seat 139 provided at the closed base 106 of the cylindrical section 104.

The second end 140 of the pin 137 is provided with an annular groove 141, which acts as a seat for a matchingly shaped locking element 142 associable with the second end itself.

Said locking element 142 is located in a matchingly shaped widened area 143, provided at the top of the impeller 111, proximate to the suction conduit 130, and prevents the impeller itself from performing axial movements in such a direction.

Advantageously, the radial blades 118 of the impeller 111 define a height dimension equal to that of the second sealed chamber 129 in order to avoid any possible winding of fiberous matter around the impeller 111.

Another embodiment of a centrifugal pump according to the invention is illustrated in FIGS. 8 to 14.

Figure 8:
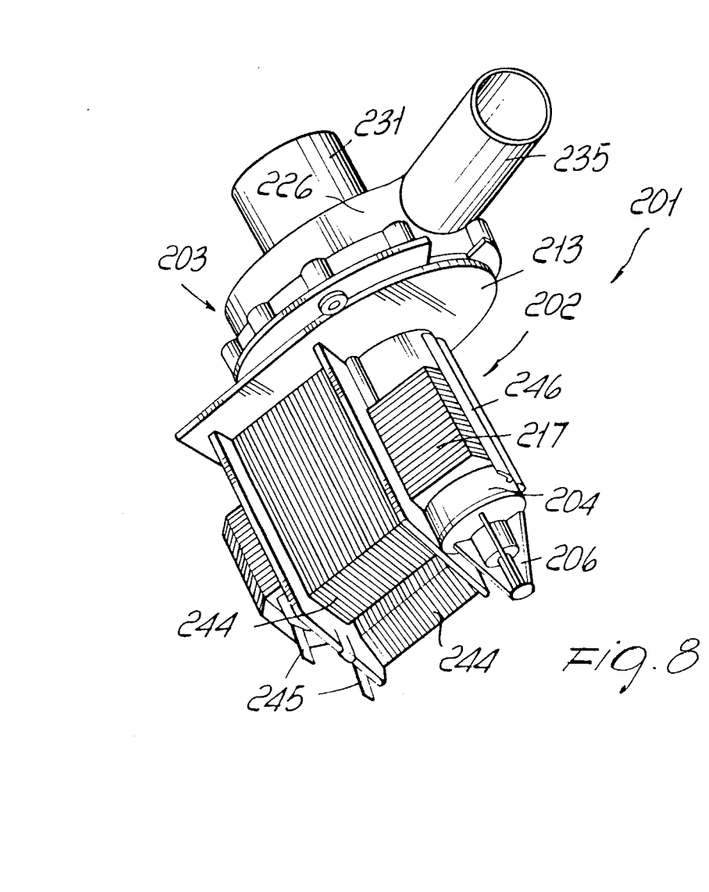
FIG. 8 is a perspective view of a second embodiment of a pump according to the invention.
Figure 9:
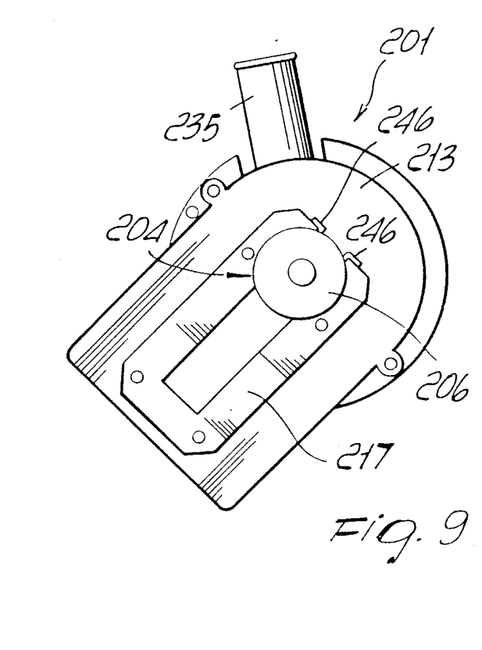
FIG. 9 is a front view from the side of the motor of the same pump shown in FIG. 8 in which the electric windings of the stator body have been omitted.

Also in this embodiment, the pump, generally referred to with the reference numeral 201, is composed of a pump body 202 complementary and associable, for example by means of screws, to a volute 203 which once assembled provides a sealed body expediently having an axial suction conduit 231, and a radial delivery conduit 235.

Both these conduits are provided in the volute 203 together with a box-like body 226 for the impeller 211, radiused towards the delivery opening.

The pump body 202 is substantially composed of a plate-like portion 213 perpendicular to a cylindrical portion 204 which contains the rotating part of the motor, which will be subsequently illustrated, and is encircled externally by the stator laminations 217 on which the stator body windings 244 are wound, which end with two electric connectors 245.

In order to keep in correct position the stator laminations 217 relatively to the cylindrical portion 204, the latter is provided with two centering fins 246 which act as an abutment for the front part of the stator 217, determining the position thereof.

Figure 10:
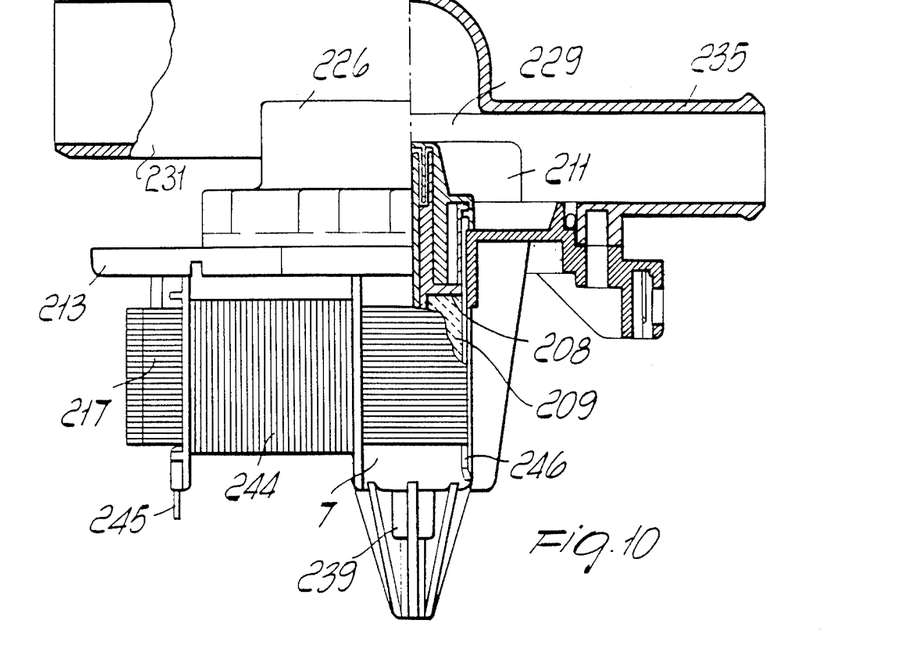
FIG. 10 illustrates a view of another embodiment of a pump according to the invention, partly cross-sectioned according to a longitudinal plane.

In FIG. 10 is illustrated an analogous solution for the pump, wherein the only difference, relatively to the FIGS. 8 and 9, is represented by the different position of the suction conduit, again indicated at 231, which now, though it axially couples with the box-like body 226 of the volute 203, is thus curved so as to extend parallel to the plate-like section 213.

These different configurations can anyway be chosen according to the installation of the pump in the household appliance.

Inside the sealed body defined by the pump body 202 and by the volute 203, and more in particular inside the cylindrical section 204, is contained a rotor 208 with permanent magnets 209 which is axially provided with a cylindrical through cavity 223, traversed by a fixed supporting and guiding pin 237, the first end thereof 238 being forced and blocked into a cylindrical seat 239 provided in the closed base 206 of the cylindrical section 204.

In this solution, therefore, the pin 237 is shown to be fixed and the rotor 208 is free to rotate, supported and guided by the pin itself.

It should suitably be noted that the rotor 208 may be advantageously obtained by injection of a plastic material into a mould, wherein the permanent magnets are positioned as inserts.

Figure 11:
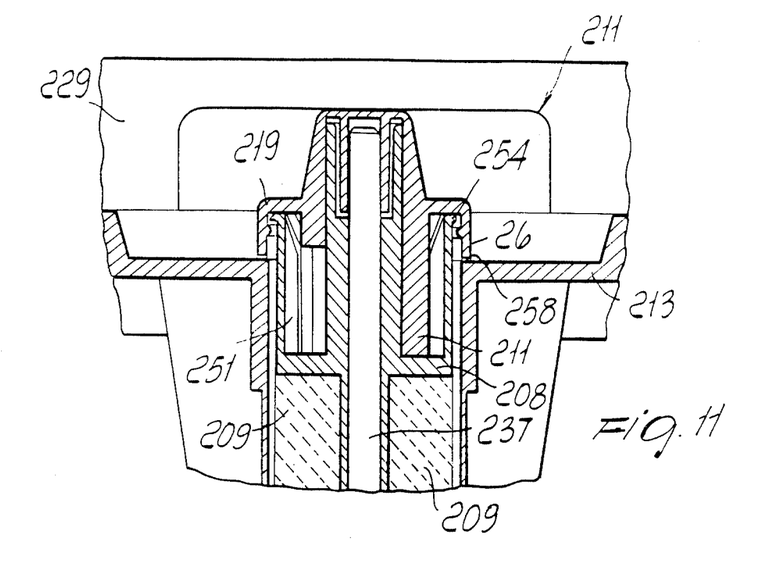
FIG. 11 is an enlarged-scale sectional view taken on a plane passing through the axis of rotation, which illustrates a detail related to the impeller-rotor coupling zone of the pump of FIG. 10.

In order to allow low friction and an excellent centering of the rotor 208, the cylindrical through cavity 223 has, at its two ends 247 and 248, a diameter which is smaller than that which can be found in the intermediate area 249, so as to practically create only two sliding areas, indicated at 250.

With this solution it is not necessary to provide any element interposed between the rotor 208 and the fixed pin 237.

Figures 12, 13, 14:
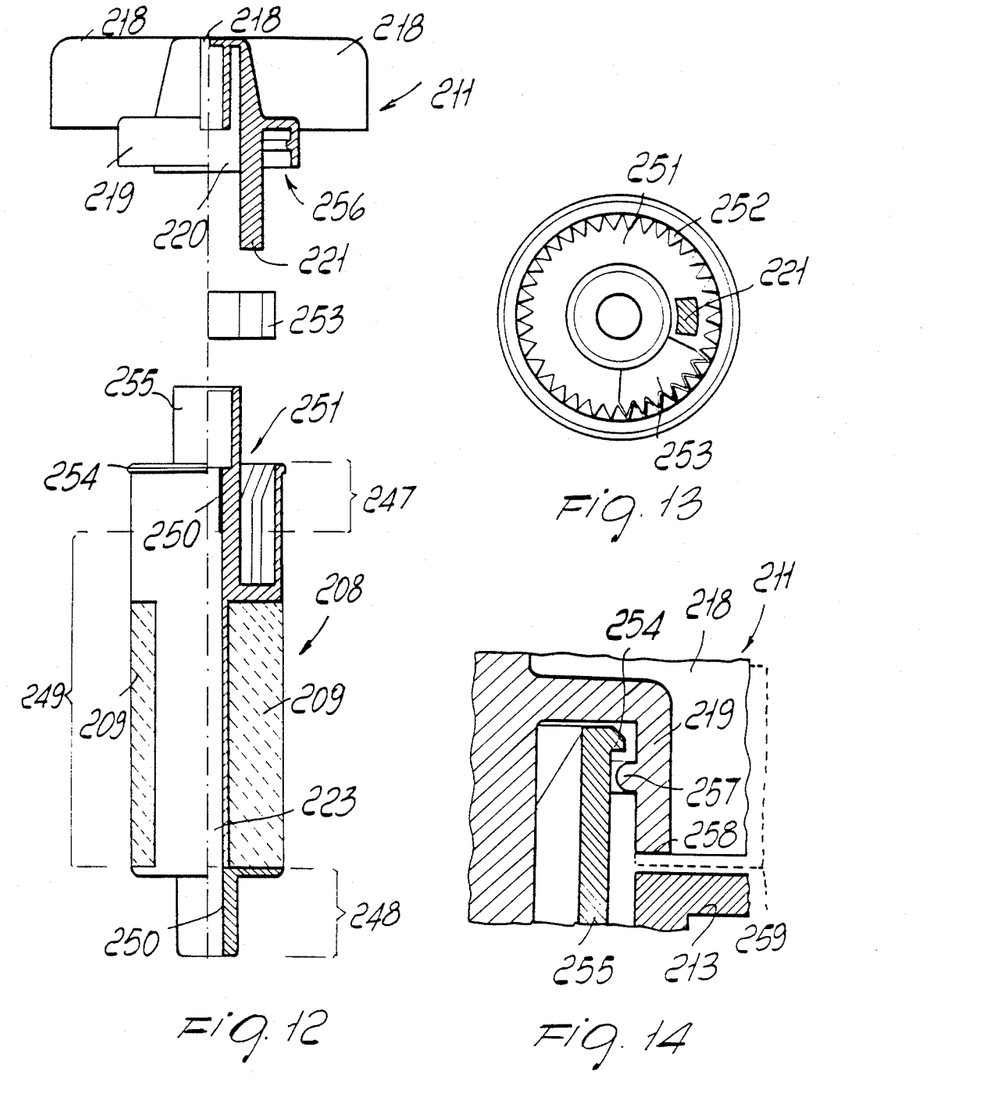
FIG. 12 is an exploded view which illustrates, part-sectioned, the rotor, the damping element and the impeller of the pump of FIG. 10.
FIG. 13 is a front view of the top part of the rotor of FIG. 12 which points out its damped connection to the impeller.
FIG. 14 is a cross sectional view, in an enlarged scale, of a detail of the impeller-rotor coupling of the embodiment of the pump illustrated in FIG. 10.

In its part proximate to the plate-like portion 213, the rotor 208 is provided with a deep annular cavity 251, having internally peripheral teeth 252 which allow for the positioning of a sector 253, and may be made of material such as rubber or elastomer, and advantageously provided with a matchingly shaped set of teeth which holds it still within the cavity 251, in the position it was inserted in.

Said rotor 208 is further provided with a toroidal protruding edge 254 which, as will be seen, will be suitable for hooking to the impeller 211.

The impeller 211, of the centrifugal type, is provided with, in the illustrated case, four radial blades 218, arranged at 90 degrees respectively, associated to an impeller body 219, provided internally with an axial bore 220, adapted for containing a cylindrical extension 255 of the rotor 208.

The impeller body 219 is further provided with an annular groove 256 which is adapted for containing the top area of the rotor 208 and, in particular, the toroidal edge 254 which is therefore blocked by an annular edge 257, present inside the annular groove 256.

It is furthermore important to notice the fact that from the impeller body 219 a lug 221 extends, which inserts within the annular hollow 251, in the space unoccupied by the rubber section 253.

In practice the impeller 211 may be provided in a plastic material and, by making use of this material's deformability, it can be associated to the rotor 208, by means of slight temporary elastic deformations which allow for the engagement between the toroidal edge 254 and the annular ridge 257.

This configuration of parts, as is more clearly illustrated in FIG. 14, allows for a safe engagement of the impeller 211 to the rotor 208, leaving however the impeller itself 211 free to rotate relatively to the rotor 208 and vice versa.

The entrainment of the lug 221 due to the motion of the rotor 208 occurs when the lug 221 is in abutment with the elastic section 253.

Also this configuration of parts has been studied allowing for the fact that an electric motor with a permanent magnet rotor is substantially of the synchronous type, and, upon starting, in order to attain synchronization must be endowed with the smallest possible start-up or starting resistance.

Thus in practice the impeller 211 is disengaged from the rotor 208 for an arc smaller than 360 degrees and the start-up, which can occur indifferently in a clockwise or an anticlockwise direction, occurs practically while the impeller is still; only when the motor is running and the section 253 engages with the lug 221 is the impeller 211 taken along in the motion.

The section 253 is advantageously provided in an elastic material, so that when it engages with the appendix 221 it is capable of absorbing the impact and of eliminating the noise due to the connection.

It should furthermore be noted that the lower edge 258 of the impeller body 219 is extended so as to substantially touch the inside face of the plate-like portion 213, assuming, when the impeller and the rotor are not moving, the position, indicated in broken lines and with the numeral 259 in FIG. 14.

In this manner any intake of dust or foreign matter in the interspace between the rotor 208 and the cylindrical portion 204 is prevented, which would entail the degrading of the sliding areas 250 between the rotor 208 and the fixed pin 237.

Once start-up has occurred, due to the depression in suction, the impeller rises, as illustrated in FIG. 14, and detaches from the internal face of the plate-like section 213 and therefore allowing for a rotation devoid from any dragging whatsoever.

It should be noted that the section of the rotor 208 within the cylindrical section 204 is stably defined by the magnetic action of the permanent magnets 209 relatively to the stator laminations 217; there is therefore the possibility of a single elastic shifting as opposed to the magnetic and electromagnetic forces, mutually attractive between the stator laminations 217 and the permanent magnets 209.

It should further be noted how the entire pump is structured in a completely symmetrical manner, both in the impeller 211 and in the second sealed chamber 229 which contains the impeller itself, since the start-up procedure can occur indifferently both in a clockwise and in an anticlockwise direction.

This fact is particularly advantageous since if the impeller should find an obstacle in a direction of rotation which causes the stopping thereof, the motor can simply resume turning in the opposite direction, thus getting rid of the obstacle and expelling it.

This occurs in particular when the pump is employed in washing machines where it is possible to find fiberous matter which can wrap around the impeller until it is stopped; at this point the motor, by restarting in the opposite direction, unwraps the fiberous matter, gets rid of the same and expels it.

Figure 15:
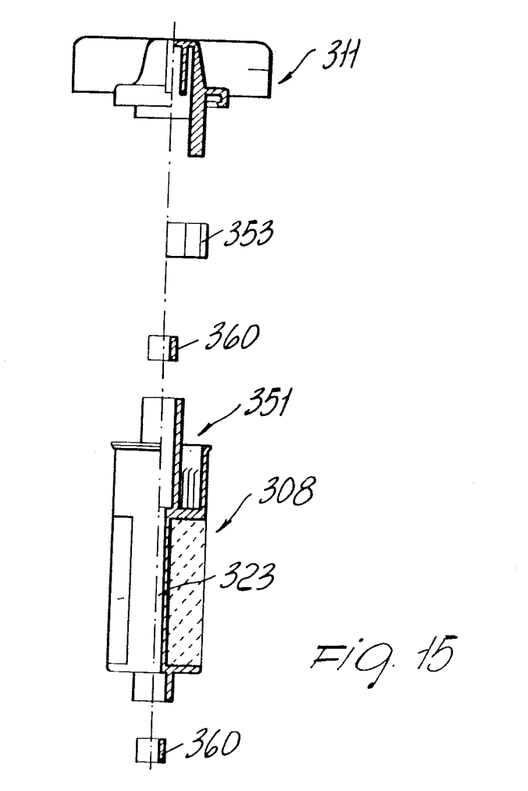
FIG. 15 is a constructive variation of the impeller-rotor cluster, relative to the embodiment of the pump illustrated in FIGS. 10 to 14.
Figure 16:
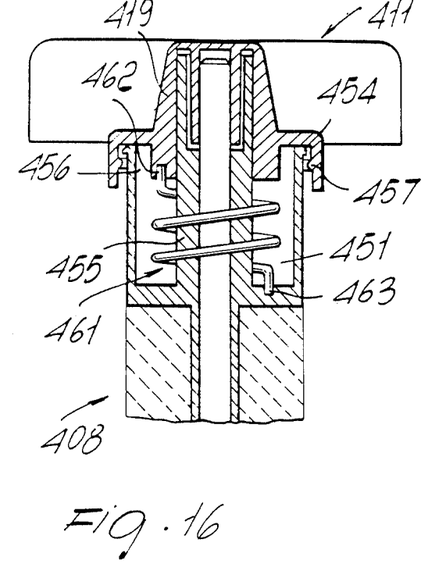
FIG. 16 is an enlarged-scale cross section view related to a different constructive variation of the rotor-impeller coupling.
Figure 17:
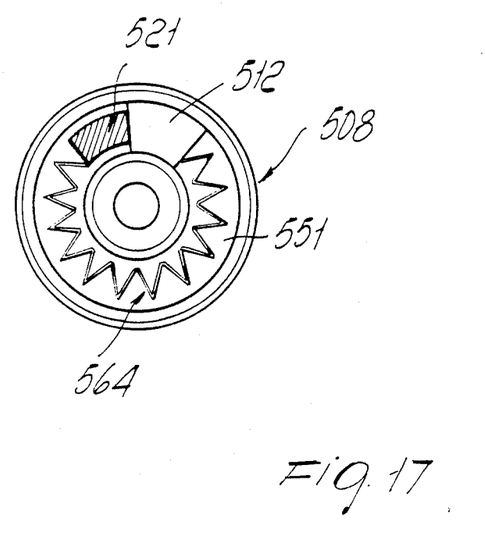
FIG. 17 is a front view of the top part of the rotor, which illustrates a further variation of the coupling to the impeller.

In the following FIGS. 15, 16 and 17 are illustrated constructive variations related to the embodiment of the pump, which has just been illustrated.

In particular, in the first variation shown in FIG. 15, the rotor 308 is still of the permanent magnet kind, practically identical to the one 208 already illustrated, it also having an annular cavity 351 in which is inserted an elastic section 353 associated with an impeller 311 perfectly identical to the one previously described.

The constructive difference lies in the fact that the ends of the through cavity 323 of the rotor 308 are widened and suitable for containing two metallic bearings 360 preferably of the cylindrical and self-centering type, which have the function of allowing for a perfect sliding of the pin which, for greater clarity, is not indicated but is perfectly identical for function and position to the pin 237 already illustrated.

The constructional diversity resides in the fact that the extremities of the through cavity 232 of the rotor 308 are enlarged and adapted to accommodate two bushings 360, preferably of the metallic cylindrical type and which have the function of permitting perfect sliding relationship with the pin which, for the sake of clarity, has not been illustrated but is perfectly identical, in function and disposition, to the pin 237, already illustrated.

Such a variation can be advantageous when the plastic material in which the rotor is provided has insufficient mechanical characteristics, so that there is a danger of a rapid wear by sliding on the fixed pin.

In the subsequent FIG. 16 is illustrated a second constructive variation, related to the transmission of the motion between the rotor 408 and the impeller 411, which are still connected to each other by means of the engagement of the toroidal edge 454 of the rotor with the annular ridge 457 within the groove 456 of the impeller 411.

In this variation, the impeller and the rotor are devoid of lugs or teeth which directly engage one another, but are instead associated by a spiral spring 461 which, positioned coaxially to the cylindrical extension 455, has its end sections 462 and 463 respectively fixed to the impeller body 419 and to the bottom of the annular cavity 451 of the rotor 408.

At the start-up of the impeller 408 the spring 461 elastically deformates by torsion, allowing the rotor itself to move through a rotation angle while the impeller 411 is practically still, which allows it to attain a speed sufficient to subsequently take along the impeller 411.

In this manner the possibility is kept of rotating both in a clockwise and in an anticlockwise direction, and furthermore the connection between the rotor 408 and the impeller 411 becomes even more damped, so that, since the two elements are constantly coupled by an elastic means, any possible beating or vibrations, which could ensue for example when the pump is not completely full of water, but has air pockets with a different and variable resistance in the course of time, are eliminated in an even more efficient manner.

A further constructive variation to the embodiment of the centrifugal pump is illustrated in the subsequent FIG. 17 and refers again to the elastic connection between the impeller 511 and the rotor 508.

In such a variation, inside the annular cavity 551 of the rotor 508 is present a fixed radial tooth 512, against a side of which a spiral spring 564 engages, which spring extends with a curved extension along the bottom of the same annular cavity 551.

At its opposite end the spring 564 engages against the side of a lug 521, shown in cross-section, which, extending from the impeller, inserts into the cavity 551, and presses said lug against the radial tooth 512.

In such a variation, when the rotor 408 tends to start-up in the direction which causes its tooth 512 to move away from the lug 521, a compression is obtained of the spring 564 which allows the rotor 508 a small stroke with the impeller stopped, sufficient to achieve the synchronicity speed required for start-up.

Instead, in the case in which the rotor 508 tends to start up in the opposite direction, due to the direct engagement between the tooth 512 and the lug 521, it should instantaneously start the impeller rotating also; however, as the rotor 508 is not capable of giving a sufficient acceleration, the start-up in this direction does not occur and the entire cluster restarts in the opposite direction.

With the described variation an excellent elastic coupling between the rotor and the impeller has been achieved, and at the same time a single possible pump rotation direction has been fixed.

Figure 18:
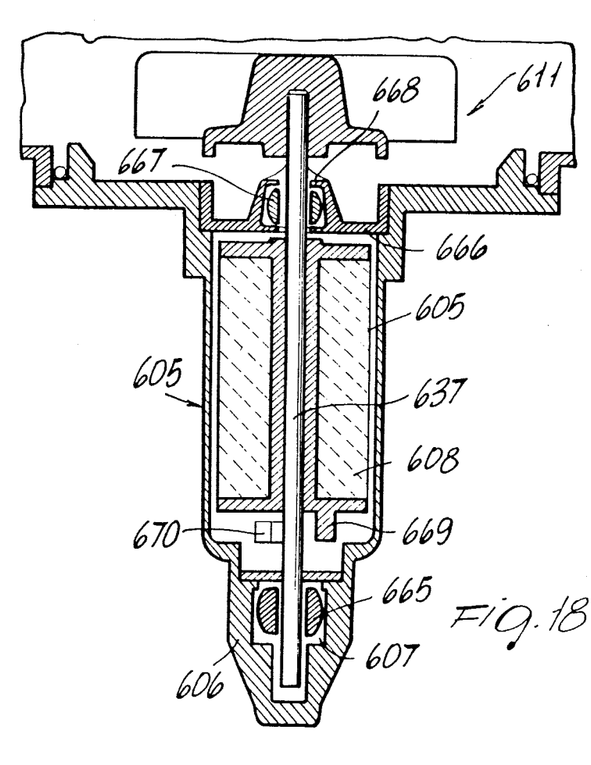
FIG. 18 illustrates a further embodiment of a centrifugal pump according to the invention.

A further embodiment of a pump according to the invention is illustrated in FIG. 18, wherein the parts are studied with a particular care for the necessity of avoiding the introduction of sand or foreign matter in the area affected by the rotor and by the sliding bearings.

In this case the axial pin, now indicated with the numeral 637, is no longer fixed but is rigidly coupled to the impeller 611 with which it rotates during the motion.

Said pin 637 is supported underneath by a first self-centering bearing 665 rigidly coupled to a reduced-diameter area 607 provided at the closed base 606 of the cylindrical section 604.

During assembly, a sealing plate 666 is inserted upwardly, it also being provided in its central area with a second self-centering bearing 667 which supports and guides the axial pin 637.

For greater safety, a sliding seal 668 can be suitably provided, which performs a seal against foreign matter in the area in which the pin 637 protrudes from the second bearing 667.

The rotor 608 is mounted free on the pin 637 and in its lower area is provided with a tooth 669 which interferes with a radial lug 670 rigidly associated with the pin 637.

Also in this case the start-up of the rotor 608 can occur both in the clockwise and in the anticlockwise direction, and the engagement with the impeller 611, rigidly associated with the pin 637, occurs after an angle of free rotation.

The first sealed chamber 605 affected by the rotor 608 can also be full of liquid, since the function of the sliding seal 668 and of the plate 666 is not so much to prevent liquids from flowing in, as it is to prevent the entry of foreign matter, such as sand, dust and the like.

From what has been described and illustrated, in the various proposed versions, it should be noted that all the preset objects have been achieved and in particular that a pump has been provided particularly suitable for use in household appliances such as washing machines, dishwashers etc., with excellent mechanical and electric characteristics.

It should be noted, in fact, that the electric part is completely external to the area affected by the liquid, while no sliding seals have in any way been provided to separate internal areas from external areas, thus eliminating any problem of liquid leakage which could wet and irreparably damage the electric winding.

For this reason a grounding protection is no longer even necessary, since the powered parts are doubly insulated from the liquid flowing in the pump itself.

The components of the pump are associable to each other in a very simple, rapid and removable manner, without requiring particular constructive difficulties. The centering means, located on the pump components, allow for the obtainment of an optimum and silent operation and the extreme constructive simplicity as well as a rapid assembly also allows for a easy and quick maintenance.

It should still be noted that the moving parts have been protected from wear due to sand, dust, etc. or other foreign matter carried in suspension in the liquid.

The employment of a permanent magnet rotor has allowed to drop considerably the power required by the pump while the possibility of starting up and rotating indifferently in the two directions entails again remarkable advantages suitable to avoid blocking and jamming problems.

As far as the hydraulic characteristics of the pump are concerned, since it is operated by a synchronous motor, it allows for a constant flow as the power supply voltage varies, with remarkable advantages in the size thereof and of the household appliances to which it is to be associated.

Obviously, starting from the same inventive concept, the invention thus conceived is susceptible of numerous modifications and variations, all within the scope of the protection of the present patent.

In practice, the materials employed, so long as compatible with the contingent use, as well as the dimensions, may be any according to the requirements and to the state of the art, and, furthermore, all the elements can be replaced by other technically equivalent elements.

I claim:

1. A centrifugal pump comprising:
 a first vertical hollow cylinder open at its upper end, said first cylinder being designated as a pump body and having an interior defining a first chamber;
 a second vertical hollow cylinder separated from the first cylinder and disposed thereabove, said first and second cylinders having a common axis, the second cylinder being open at its lower end, being designated as a volute, and having an interior defining a second chamber, the open ends of the first and second cylinders being sealed together;
 a permanent magnet rotor disposed in the first chamber and rotatable about the axis;
 an impeller rotatable about the axis and disposed in the second chamber;
 coupling means interconnecting the rotor and impeller in rotative relationship;
 centering means interconnecting the rotor and impeller to maintain them in axial alignment;
 a plurality of spaced centering fins secured to the outer surface of the first cylinder and extending in the axial direction; and
 an electric motor stator body disposed adjacent and exterior to the first cylinder, said stator body having laminations lying in parallel planes disposed at right angles to the centering fins and having spaced apart front ends, the laminations being secured to the front ends of the fins.

2. A centrifugal pump comprising:
 a first vertical hollow cylinder open at its upper end, the first cylinder being designated as a pump body and having an interior defining a first chamber;
 a second vertical hollow cylinder separated from the first cylinder and disposed thereabove, the first and second cylinders having a common axis, the second cylinder being open at its lower end and being designated as a volute, the second cylinder having an interior defining a second chamber, the upper end of the first cylinder and the lower end of the second cylinder being sealed together;
 a permanent magnet rotor disposed in the first chamber and rotatable about the axis;

an impeller disposed in the second chamber and rotatable about the axis;
centering means interconnecting the rotor and impeller to maintain them in axial alignment;
an electrical motor stator body disposed adjacent and exterior to the first cylinder; and
an end of the rotor adjacent the impeller has a toroidal border defining a hooking element and the end of the impeller adjacent the rotor has an annular groove in which the said rotor end is disposed, the annular groove having an inner annular ridge which is engaged by the hooking element.

3. The pump as set forth in claim 2 wherein said impeller after hooking to said rotor is free to rotate relatively to the latter, as the hooking is not a stable association.

* * * * *